_(12)_ United States Patent
Backman (10) Patent No.: US 9,325,183 B2
(45) Date of Patent: Apr. 26, 2016

(54) REDUCING INDUCTIVE HEATING (71) Applicant: Nokia Corporation, Espoo (FI)

(72) Inventor: Juha Reinhold Backman, Espoo (FI)

(73) Assignee: Nokia Technologies Oy, Espoo (FI)

( * ) Notice: Subject to any disclaimer, the term of this patent is extended or adjusted under 35 U.S.C. 154(b) by 304 days.

(21) Appl. No.: 13/724,672

(22) Filed: Dec. 21, 2012

(65) Prior Publication Data

US 2014/0176058 A1    Jun. 26, 2014

(51) Int. Cl.
| | |
|---|---|
| *H02J 7/00* | (2006.01) |
| *H01F 7/02* | (2006.01) |
| *H01F 41/02* | (2006.01) |
| *H02J 7/02* | (2016.01) |
| *H01F 27/38* | (2006.01) |
| *H01F 38/14* | (2006.01) |
| *H04R 9/02* | (2006.01) |
| *H01F 27/34* | (2006.01) |

(52) U.S. Cl.
CPC ............ *H02J 7/0042* (2013.01); *H01F 7/02* (2013.01); *H01F 27/38* (2013.01); *H01F 38/14* (2013.01); *H01F 41/02* (2013.01); *H02J 7/025* (2013.01); *H04R 9/022* (2013.01); *H01F 2027/348* (2013.01); *Y10T 29/49117* (2015.01)

(58) Field of Classification Search
CPC ........... H01F 7/02; H01F 41/02; H01F 38/14; H01F 27/38; H01F 2027/348; H02J 7/0042; H02J 7/025; H04R 9/022; Y10T 29/49117
See application file for complete search history.

(56) References Cited

U.S. PATENT DOCUMENTS

| | | | | |
|---|---|---|---|---|
| 3,622,869 | A * | 11/1971 | Golay ........................... | 324/320 |
| 4,151,379 | A * | 4/1979 | Ashworth ..................... | 381/402 |
| 4,358,691 | A * | 11/1982 | Naylor ....................... | 310/12.24 |
| 4,378,471 | A * | 3/1983 | Shintaku ....................... | 381/420 |
| 4,845,450 | A * | 7/1989 | Porzio et al. .................. | 335/215 |
| 5,042,072 | A * | 8/1991 | Button ........................ | 381/397 |
| 5,070,530 | A * | 12/1991 | Grodinsky et al. ........... | 381/422 |
| 5,357,587 | A * | 10/1994 | Grodinsky et al. ........... | 381/414 |
| 5,497,428 | A * | 3/1996 | Rojas ............................ | 381/414 |
| 5,577,504 | A * | 11/1996 | Salloway et al. ............. | 600/410 |
| 5,656,983 | A * | 8/1997 | Ito et al. ....................... | 335/297 |

(Continued)

FOREIGN PATENT DOCUMENTS

| | | |
|---|---|---|
| CN | 202282858 U | 6/2012 |
| EP | 2246864 A1 | 11/2010 |

(Continued)

OTHER PUBLICATIONS

Taozhen Dai, et al.; "Research on Eddy Loss in Cooling Configuration of Conduction-cooled High Temperature Superconducting Magnet," Shandong University of Science and Technology, Electrical Machines and Systems, 2008. ICEMS 2008. International Conference; Oct. 17-20, 2008: pp. 493-496.

*Primary Examiner* — Naum B Levin
(74) *Attorney, Agent, or Firm* — Harrington & Smith (57) ABSTRACT

An apparatus including a magnet assembly having at least two magnet assembly components; and an eddy current heating reduction system configured to reduce heating of the magnet assembly by magnetic fields. The eddy current heating reduction system includes electrical insulation between the at least two magnet assembly components, and includes at least one of the at least two magnet assembly components having a divided current loop area at least two spaced subsections.

20 Claims, 7 Drawing Sheets

(56) References Cited

U.S. PATENT DOCUMENTS

| | | | |
|---|---|---|---|
| 6,067,365 A * | 5/2000 | Morenz | 381/412 |
| 6,087,755 A * | 7/2000 | Suzuki et al. | 310/216.091 |
| 6,731,773 B1 * | 5/2004 | Bergbower et al. | 381/397 |
| 6,768,806 B1 * | 7/2004 | Button et al. | 381/401 |
| 7,065,225 B2 * | 6/2006 | Stiles | 381/412 |
| 7,406,873 B2 * | 8/2008 | Paige et al. | 73/643 |
| 7,457,429 B2 * | 11/2008 | Stiles | 381/414 |
| 8,169,185 B2 * | 5/2012 | Partovi et al. | 320/108 |
| 8,253,299 B1 * | 8/2012 | Rittenhouse | 310/257 |
| 8,692,635 B2 * | 4/2014 | Slotte | 335/220 |
| 2002/0094105 A1 * | 7/2002 | Boniface | 381/397 |
| 2005/0041831 A1 | 2/2005 | Stiles et al. | 381/412 |
| 2006/0097583 A1 * | 5/2006 | Dodd | 310/12 |
| 2006/0188120 A1 * | 8/2006 | Fisher | 381/338 |
| 2007/0001921 A1 * | 1/2007 | Takahashi et al. | 343/788 |
| 2007/0297639 A1 * | 12/2007 | Noll | 381/421 |
| 2009/0310813 A1 | 12/2009 | Sumitani et al. | 381/397 |
| 2010/0320843 A1 * | 12/2010 | Kitamura et al. | 307/104 |
| 2011/0050164 A1 | 3/2011 | Partovi et al. | 320/108 |
| 2011/0062793 A1 * | 3/2011 | Azancot et al. | 307/116 |
| 2011/0278951 A1 * | 11/2011 | Kurihara et al. | 307/104 |
| 2012/0235636 A1 | 9/2012 | Partovi | 320/108 |
| 2012/0248916 A1 * | 10/2012 | Clark | 310/156.12 |
| 2013/0163806 A1 * | 6/2013 | North et al. | 381/396 |
| 2014/0011447 A1 * | 1/2014 | Konanur et al. | 455/41.1 |
| 2014/0238737 A1 * | 8/2014 | Backman | 174/396 |

FOREIGN PATENT DOCUMENTS

| | | | | |
|---|---|---|---|---|
| JP | 62210800 A | * | 9/1987 | H04R 9/00 |
| WO | WO-2009/116025 A2 | | 9/2009 | |

* cited by examiner

Prior Art

REDUCING INDUCTIVE HEATING

BACKGROUND

1. Technical Field

The exemplary and non-limiting embodiments relate generally to preventing heat from being generated and, more particularly, to heat caused by eddy currents.

2. Brief Description of Prior Developments

Speakers having multiple magnets are know. Speaker magnet assemblies having more than one pole piece are known.

SUMMARY

The following summary is merely intended to be exemplary. The summary is not intended to limit the scope of the claims.

In accordance with one aspect, an apparatus includes a magnet assembly comprising at least two magnet assembly components; and an eddy current heating reduction system configured to reduce heating of the magnet assembly by magnetic fields, where the eddy current heating reduction system comprises electrical insulation between the at least two magnet assembly components, and by providing at least one of the at least two magnet assembly components with a divided current loop area having at least two spaced subsections.

In accordance with another aspect, a method comprises providing at least one magnet; and connecting at least one pole piece to the at least one magnet, where the at least one pole piece is electrically insulated from the at least one magnet, and where the at least one pole piece and/or the least one magnet comprises a divided eddy current loop area having multiple spaced subsections to reduce eddy current heating of the at least one pole piece and/or the at least one magnet by magnetic fields.

In accordance with another aspect, an apparatus comprises a housing; a rechargeable battery in the housing; an induction charging system in the housing coupled to the rechargeable battery; and a magnet assembly in the housing, where the magnet assembly comprises at least one magnet and a first pole piece forming a top plate connected to the at least one magnet, where the top plate is electrically insulated from the at least one magnet, and where the top plate comprises a divided eddy current loop area having multiple spaced subsections to reduce eddy current heating of the top plate by magnetic fields used for recharging the battery by the induction charging system.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
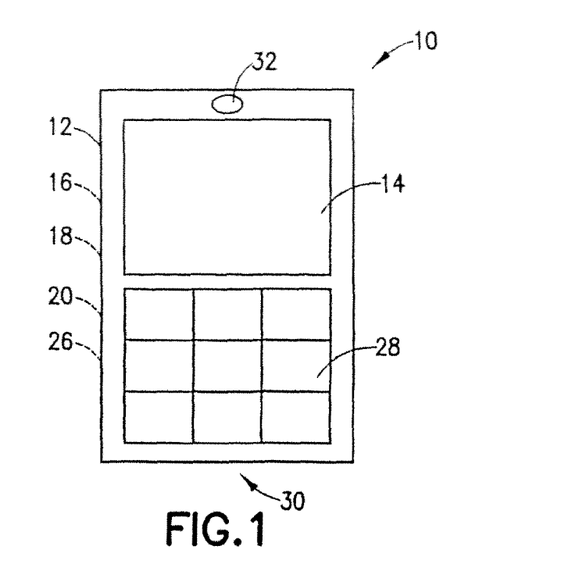
FIG. 1 is a front view of an example embodiment.

Referring to FIG. 1, there is shown a front view of a device or apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 2:
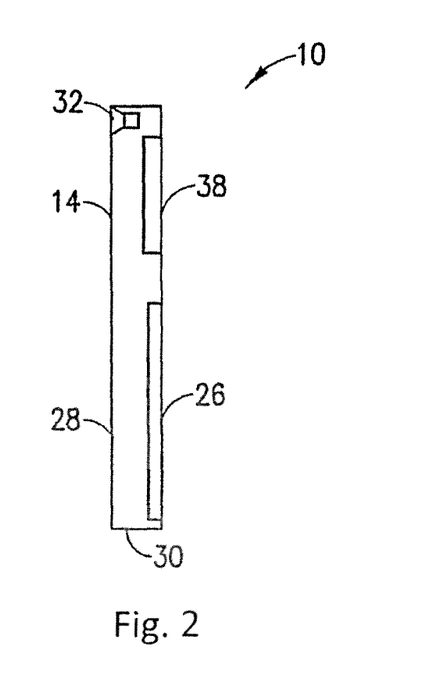
FIG. 2 is a side view of the example shown in FIG. 1.

Referring also to FIG. 2, the apparatus 10 may be a handheld communications device which includes a telephone application. The apparatus 10 may comprise an Internet browser application, camera application, video recorder application, music player and recorder application, email application, navigation application, gaming application, and/or any other suitable electronic device application. The apparatus 10, in this example embodiment, comprises a housing 12, a display 14, a receiver 16, a transmitter 18, a rechargeable battery 26, and a controller 20 which can include at least one processor, at least one memory, and software. However, all of these features are not necessary to implement the features described below.

The display 14 in this example may be a touch screen display which functions as both a display screen and as a user input. However, features described herein may be used in a display which does not have a touch, user input feature. The user interface may also include a keypad 28. However, the keypad might not be provided if a touch screen is provided. The electronic circuitry inside the housing 12 may comprise a printed wiring board (PWB) having components such as the controller 20 thereon. The circuitry may include a sound transducer 30 provided as microphone and a sound transducer 32 provided as a speaker or earpiece. The housing 12 may have sound holes for sound to travel to and from the sound transducers through the housing 12.

Figure 3:
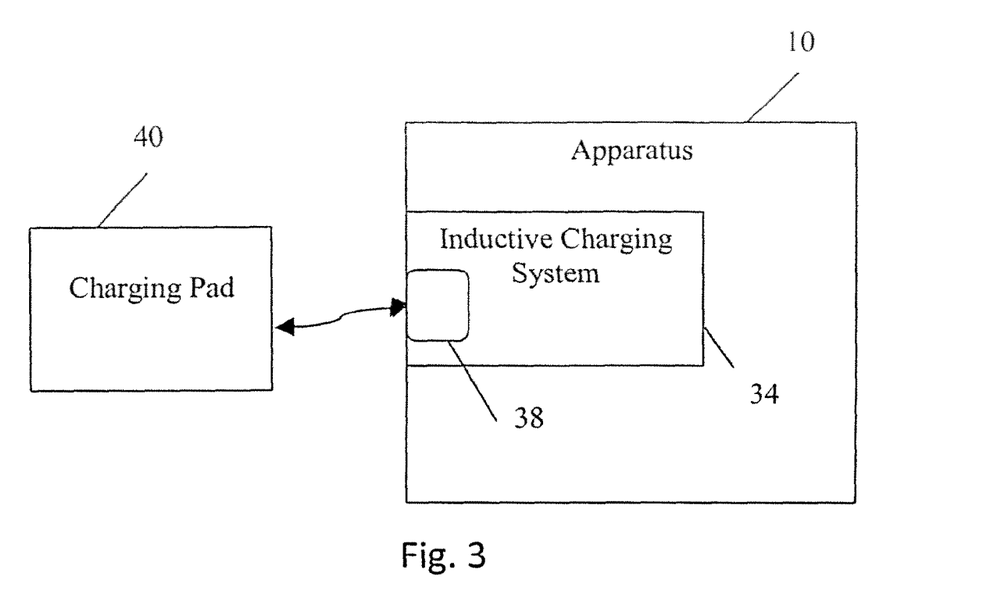
FIG. 3 is a diagram illustrating connection of the apparatus shown in FIG. 1 to a charging station for inductive charging.

Referring also to FIG. 3, the apparatus 10 comprises an inductive charging system 34. The inductive charging system 34 provides a means to allow the rechargeable battery 26 to be recharged by use of inductive charging. Inductive charging uses an electromagnetic field to transfer energy between two objects. This is usually done with a charging station, such as charging pad 40 for example. Energy is sent through inductive coupling to an electrical device (the apparatus 10), which then can use that energy to charge battery(ies).

The inductive charging system 34 comprises an induction coil 38. This induction coil 38 cooperates with a coil in the charging station 40 to induce a current in the coil 38. This current can be used to recharge the battery 26. Because there is a small gap between the two coils employed in each of the sender and receiver of the energy within the respective devices, inductive charging is considered short-distance "wireless" energy transfer, because it frees the user from having to deal with wires between the two devices.

Figure 4:
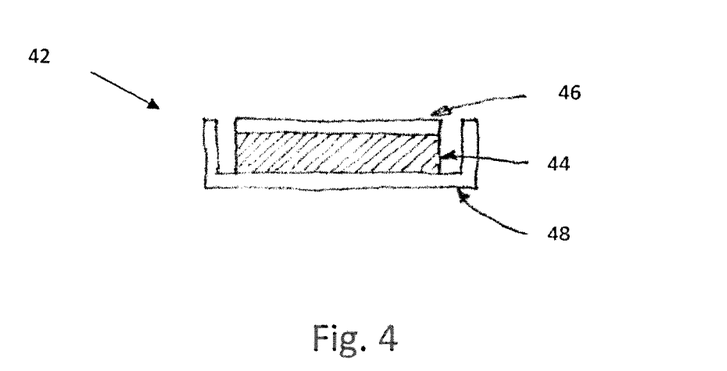
FIG. 4 is a cross sectional view of magnet assembly in the apparatus shown in FIG. 1.
Figure 5:
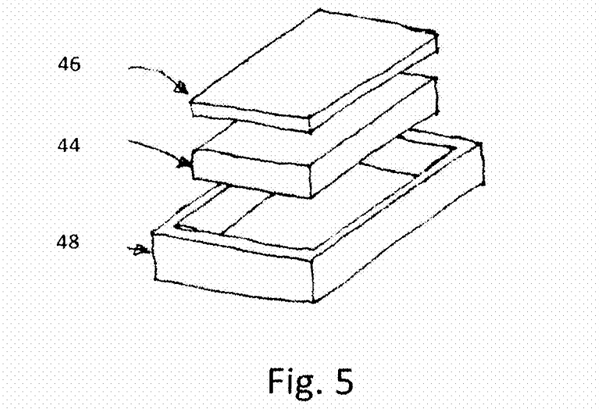
FIG. 5 is an exploded perspective view of the magnet assembly shown in FIG. 4.

Referring also to FIGS. 4-5, a magnet assembly 42 of the sound transducer 32 of the earpiece is schematically shown which includes permanent magnet 44 and pole pieces 46, 48. In an alternate example the magnet may comprise an electromagnet, and features as described herein may be used with another component other than the magnet assembly of the earpiece, such as the magnet assembly of a speaker for example. The magnet may comprises one or more magnets. The pole pieces may comprises two or more pole pieces.

The second pole piece 48, such as formed of iron for example, forms an outer part ("pot"). The magnet 44 may be a neodymium magnet for example. The first pole piece 46 forms a top plate in this example, such as formed of iron for example. The top plate 46 may merely be a planar flat plate. The top plate and pot may be formed of iron with anticorrosive plating, such as nickel or zinc, and the magnet may be made of a neodymium alloy.

Figure 6:
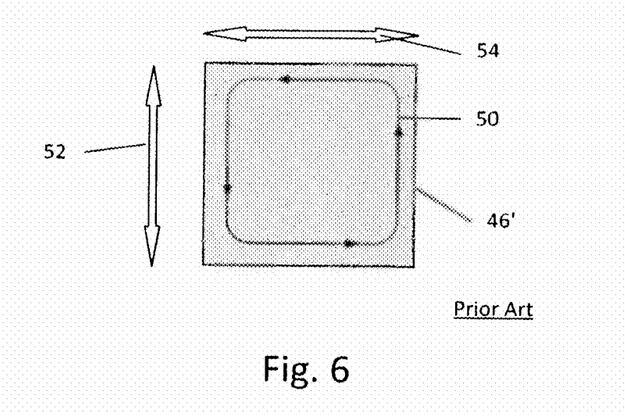
FIG. 6 is a top plan view of a conventional top pole piece of a magnet assembly.

FIG. 6 is a top plan view of a conventional top plate 46' used in a mobile phone earpiece or speaker magnet assembly. FIG. 6 illustrates how an eddy current 50 may be formed when the apparatus 10 is being charged via the inductive charging system 34 with the charging pad 40. The top plate 46' has a general square or rectangular shape with length and width dimensions 52, 54. A problem that has become apparent with the introduction of inductive charging in portable devices, such as mobile phones for example, is that many metal parts, including in loudspeakers or earpieces, can heat substantially when placed in close proximity of the charging coil. This is due to the surface currents induced in the metal. This can cause a significant additional temperature increase in the component itself and in the interior of the device being charged. For example, when a small speaker is placed on a test charging pad producing a field corresponding to typical charging conditions of a smart phone, the temperature increase in 6 minutes is approximately 30° C. (86° F.). In actual products the increase is smaller due to less critical placement and the effects of other components. However, the heating is still important especially if the loudspeaker is used for sound reproduction while charging. The excessive heat may degrade the performance, or shorten the life span, of components in the apparatus for example. For a magnet assembly in an earpiece, this may also be undesirable to place such a heated component close to the user's skin (ear). For example, if the ambient temperature is 90° F., and the temperature increase is 86° F., the temperature of the heated component would be 176° F. Features as described herein may be used to provide a temperature lower than 176° F. for the same type of situation.

Figure 7:
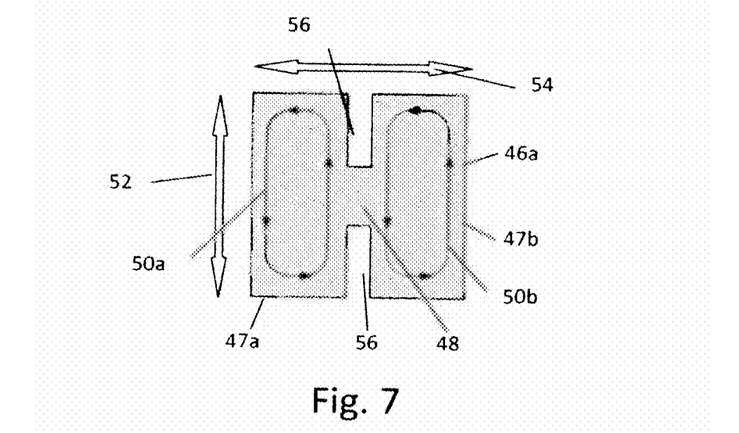
FIGS. 7 and 8 are top plan views of top pole pieces of examples of a magnet assembly comprising features as described herein.

FIG. 7 illustrates one example of the first pole piece 46a for helping to reduce heating caused by inductive charging. The length and width dimensions 52, 54 and thickness dimensions are the same as the top plate 46'. In this example the first pole piece 46a is a one-piece planar flat member having two cuts or spaces 56. The spaces 56 form the first pole piece 46a into two spaced subsections 47a, 47b with a relatively small, thin bridge section or connecting section 48 connecting the two subsections 47a, 47b together. The spaces 56 and bridge section 48 are sized and shaped such that, when the first pole piece 46a is exposed to the magnetic fields from the charging pad 40, when the apparatus 10 is being charged via the inductive charging system 34, smaller eddy currents 50a, 50b are formed versus the relatively larger eddy current 50 shown in FIG. 6. This results in less heat being generated in the plate 46a versus the conventional plate 46'.

Figure 8:
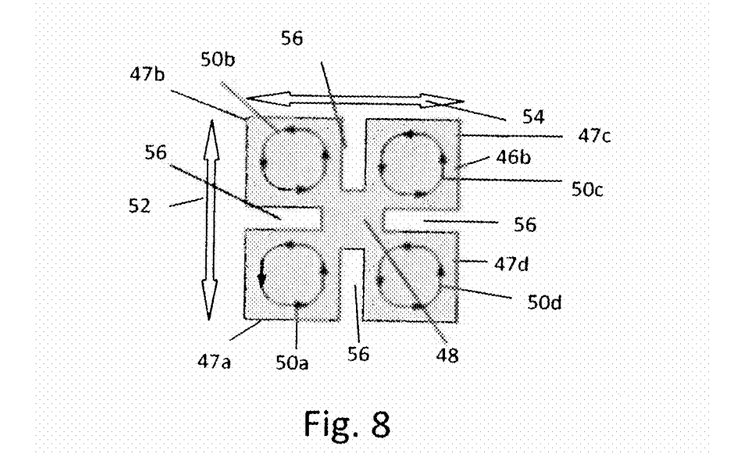

FIG. 8 illustrates another example of the first pole piece 46b for helping to reduce heating caused by inductive charging. The length and width dimensions 52, 54 and thickness dimensions are the same as the top plate 46'. In this example the first pole piece 46b is a one-piece planar flat member having four cuts or spaces 56. The spaces 56 form the first pole piece 46b into four spaced subsections 47a, 47b, 47c, 47d with a relatively small, thin bridge section or connecting section 48 connecting the four subsections 47a, 47b, 47c, 47d together. The spaces 56 and bridge section 48 are sized and shaped such that, when the first pole piece 46b is exposed to the magnetic fields from the charging pad 40, when the apparatus 10 is being charged via the inductive charging system 34, smaller eddy currents 50a, 50b, 50c, 50d are formed versus the relatively larger eddy current 50 shown in FIG. 6. This results in less heat being generated in the plate 46b versus the conventional plate 46'.

Figure 9:
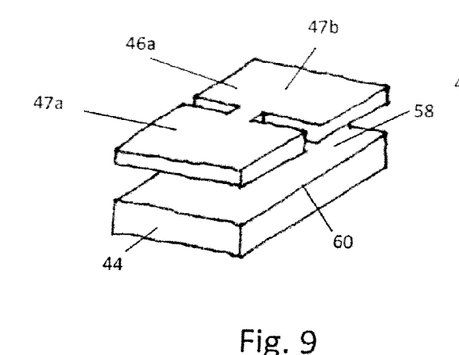
FIGS. 9 and 10 are exploded perspective views of the top pole pieces shown in FIGS. 7 and 8, and a permanent magnet used to form magnet assemblies.

FIG. 9 is an exploded perspective view of the top plate 46a of FIG. 7 with the magnet 44. In this example an electrically insulating adhesive 58 is used to mount the top plate 46a to first side 60 of the magnet 44. The electrically insulating adhesive 58 insures that the magnet 44 does not provide a short circuit path between the two subsections 47a, 47b.

Figure 10:
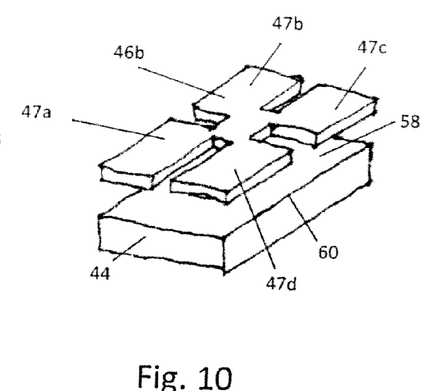

FIG. 10 is an exploded perspective view of the top plate 46b of FIG. 8 with the magnet 44. In this example an electrically insulating adhesive 58 is used to mount the top plate 46b to a first side 60 of the magnet 44. The electrically insulating adhesive 58 insures that the magnet 44 does not provide a short circuit path among the four subsections 47a, 47b, 47c, 47d.

Figure 11:
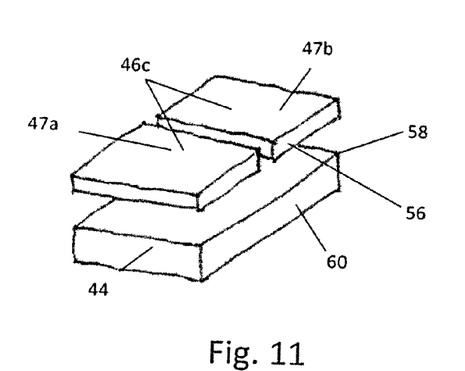
FIGS. 11-12 are exploded perspective views of an alternative example of a top pole piece, and different examples of a permanent magnet(s) used to form magnet assemblies.

FIG. 11 illustrates another example where the magnet assembly comprises two plates 46c which form the top pole piece. A gap 56 is provided between the two plates 46c such that they do not directly electrically touch other. The two plates 46 form the two subsections 47a, 47b, respectively. Electrically insulating adhesive 58 is used to mount the two plates 46c to a first side 60 of the magnet 44. The electrically insulating adhesive 58 insures that the magnet 44 does not provide a short circuit path between the two subsections 47a, 47b.

Figure 12:
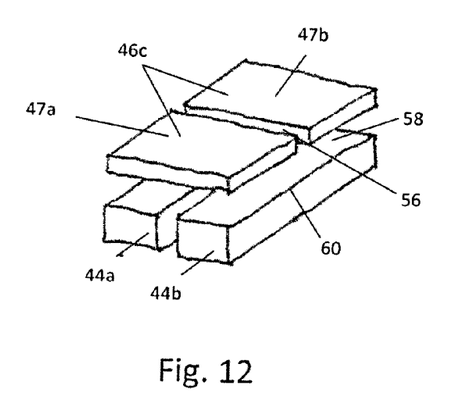

FIG. 12 illustrates another example where the magnet assembly comprises the two plates 46c which form the top pole piece. A gap 56 is provided between the two plates 46c such that they do not directly electrically touch each other. The two plates 46 form the two subsections 47a, 47b, respectively. The magnet in this example comprises two magnets 44a, 44b. Electrically insulating adhesive 58 is used to mount the two plates 46c to a first sides of the magnets 44a, 44b. The electrically insulating adhesive 58 insures that the magnets 44 do not provide a short circuit path between the two subsections 47a, 47b. The plates 46c and the adhesive mechanically retain the magnets together in the magnet assembly.

Figure 13:
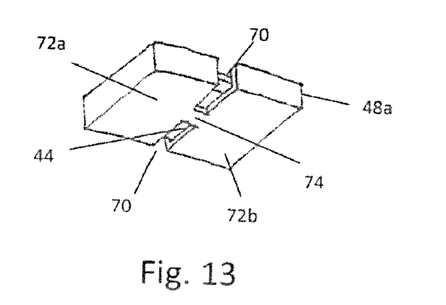
FIGS. 13-15 are bottom perspective views illustrating different examples of the bottom pole pieces of magnet assemblies.

FIG. 13 illustrates an example of the second pole piece. The second pole piece 48a in this example forms the outer part ("pot") having a bottom wall and upstanding side walls forming a recess. The magnet 44 is located in the recess. The magnet 44 may be mounted in the recess with electrically insulating adhesive for example. The pot 48a comprises two cuts or spaces 70. The spaces 70 form the second pole piece 48a into two spaced subsections 72a, 72b with a relatively small, thin bridge section or connecting section 74 connecting the two subsections 72a, 72b together. The spaces 70 and bridge section 74 are sized and shaped such that, when the second pole piece 48a is exposed to the magnetic fields from the charging pad 40, when the apparatus 10 is being charged via the inductive charging system 34, smaller eddy currents are formed in the pot 48a versus the relatively larger eddy current in a same size pot which does not have the spaces 70. This results in less heat being generated in the pot 48a versus a conventional pot.

Figure 14:
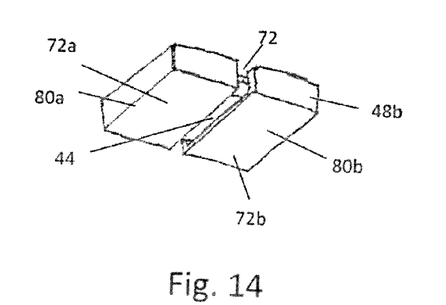

FIG. 14 illustrates another example of the second pole piece. The second pole piece 48b in this example forms the outer part ("pot") having a bottom wall and upstanding side walls forming a recess. The magnet 44 is located in the recess. The magnet 44 may be mounted in the recess with electrically insulating adhesive for example. The pot 48b comprises two separate members 80a, 80b wish a space 72 therebetween. The spaced members 80a, 80b, because they are spaced, are electrically separate from each other. The spaced members 80a, 80b form two spaced subsections 72a, 72b but do not have the thin bridge section 74 connecting the two subsections 72a, 72b together. Instead, the members 80a, 80b are attached to the magnet 44 by the electrically insulating adhesive, and the magnet 44 functions to retain the pieces 80a, 80b with the magnet assembly. When the second pole piece 48b is exposed to the magnetic fields from the charging pad 40, when the apparatus 10 is being charged via the inductive charging system 34, smaller eddy currents are formed in the pot 48b versus the relative larger eddy current in a same size pot 48 which does not have the space 72. The reduces size eddy currents result in less heat being generated in the pot 48b versus a conventional pot.

Figure 15:
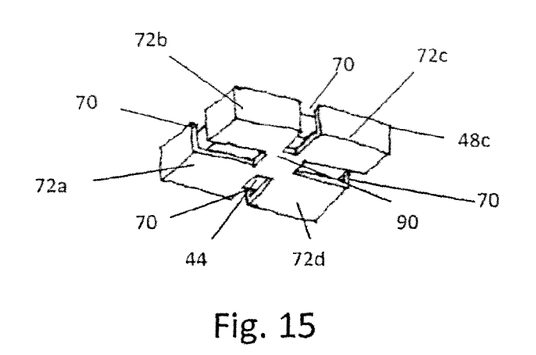

FIG. 15 illustrates another example of the second pole piece. The second pole piece 48c in this example forms the outer part ("pot") having a bottom wall and upstanding side walls forming a recess. The magnet 44 is located in the recess. The magnet 44 may be mounted in the recess with electrically insulating adhesive for example. The pot 48c comprises four cuts or spaces 70. The spaces 70 form the second pole piece 48c into four spaced subsections 72a, 72b, 72c, 72d with a relatively small, thin bridge section or connecting section 90 connecting the two subsections 72a, 72b, 72c, 72d together. The spaces 70 and bridge section 90 are sized and shaped such that, when the second pole piece 48c is exposed the magnetic fields from the charging pad 40, when the apparatus 10 is being charged via the inductive charging system 34, four smaller eddy currents are formed in the pot 48c versus one relatively larger eddy current in a same size pot which does not have the spaces 70. The smaller eddy currents result in less heat being generated in the pot 48a versus a conventional pot.

Simulations show that when placed in an alternating magnetic field, corresponding to that used in inductive charging (100-200 kHz), strong current is induced on an outer surface (0.2-0.4 mm layer, depending on material and frequency) of the pot and the top plate, causing significant inductive heating and also, from a charging point of view, efficiency losses.

Figure 16:
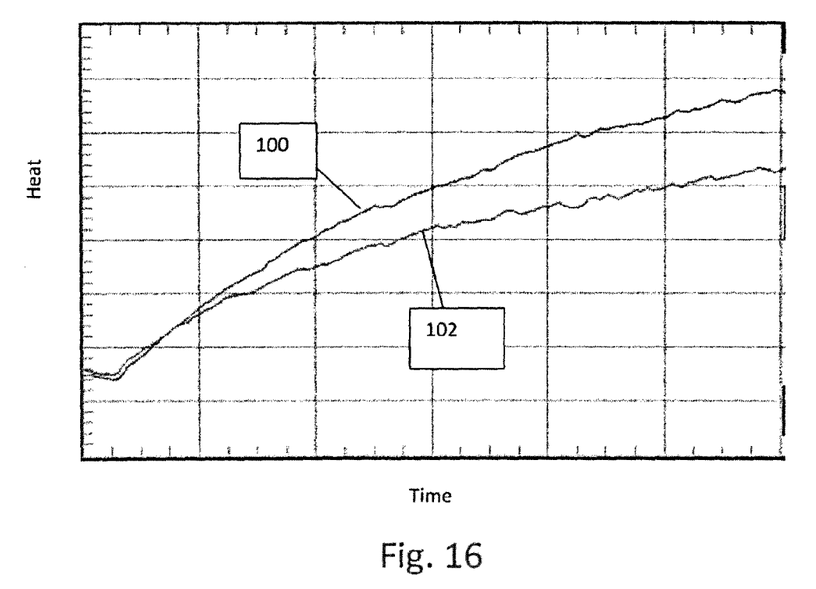
FIG. 16 is a chart illustrating reduced heating during induction charging of divided magnets.

As illustrated by FIG. 12, it is possible to divide the magnet itself into smaller parts. Referring also to FIG. 16, measured inductive heating 100 in a magnet assembly of a small loudspeaker (such as a Donau) with normal magnet is shown occurring over a period of about 4 minutes. 102 shows a simulation with a magnet divided into two halves. Further reduction is possible with smaller subdivisions of the magnet and/or pole pieces, which need not to be fully separated like in the example of FIG. 12. For the example of FIG. 16, the efficiency of this arrangement was tested in a rather simple manner by just splitting the magnet assembly into two equal parts. This arrangement shows about a 30% reduction in temperature increase. Other tests made using thin metal sheets indicate that smaller subdivisions, which can be also partial cuts, will provide an even more significant heating reduction. The gaps or spaces or cuts can be as narrow as the manufacturing technology allows.

Features described herein may be used with an audio transducer, such as with a dynamic loudspeaker or earpiece, in portable device where inductive charging may be used.

Features as described herein provide a solution to the heating problem associated with induction charging. Splitting parts of electromagnetic systems into smaller subareas to reduce eddy current losses is used in power electrical systems, such as motor or transformer design. These are loudspeaker products where the magnet assembly consists of several small magnets, but they are for increasing flux density, based on manufacturing considerations (some horn drivers, such as 18 Sound neodymium drivers), or based on a combination of manufacturing considerations and improving air flow in the magnet assembly (SEAS Excel Hexadym magnet assembly, some larger Focal woofers).

As described herein, parts of a typical miniature speaker magnet assembly may be fully or partially cut to reduce the effective current loop area of the magnetic assembly. The magnet assembly parts are also electrically insulated from each other (such as by adhesive for example) to prevent current flow. With suitable electrical insulation, inductive heating reduction can be implemented using a broader variety of magnet assembly geometries (pole pieces and/or magnet(s)).

The amount of the induced eddy current is easily reduced by simply reducing the surface area of the current loop by dividing the area into smaller subsections. This may provide effective low frequency current loop areas in uncut and cut magnet assembly parts to reduce heating. In some examples, only partial cut-outs are illustrated, but similar principles apply also to parts fully cut into smaller subdivisions, or combinations of these. Measurements of current drawn from the power supply driving the test charger indicate that the overall induced current is significantly reduced. This division into smaller subsections can be achieved with several different geometries, examples of which are given in the figures for the top plate, and the magnet, and the pot. Use of split magnets is illustrated only in FIG. 12, but the same principle may be applied with all the top plate geometries. If desired, these can be combined with any of the top plates and magnet arrangements illustrated in the figures, or any other suitable types of shapes and sizes of cuts or spaces.

To ensure that the eddy currents are reduced it is important to ensure that the parts are electrically isolated. For example, such that the magnet does not short circuit around the gaps. As the loudspeakers are usually made using an adhesive, this should not be a problem, but some miniature loudspeakers have used riveting (common in full scale loudspeakers), in which case additional electrical isolation needs to be provided separately.

By introducing narrow gaps in the magnet assembly, midrange sensitivity is reduced by the amount proportional to the gap area as compared to the full air gap area, but this loss can be kept small.

Introducing gaps in the top plate and pot also reduces the alternating current induced in these structures by the voice coil current, and as this induced current would flux modulation, this would have some impact on the distortion produced by flux modulation. This distortion mechanism, however, is not dominating in miniature loudspeakers, and some beneficial audio frequency induced currents can be retained by keeping the magnet in one piece, which makes also sense from manufacturing point view.

In one type of example, an apparatus 10 or 32 comprises magnet assembly 42 comprising at least one magnet 44, and at least one pole piece 46 and/or 48 connected to at least one magnet; and an eddy current heating reduction system configured to reduce heating of the magnet assembly by magnetic fields, where the eddy current heating reduction system comprises electrical insulation between the at least one magnet and the at least one pole piece, and by providing the at least one pole piece with a divided current loop area 47*a*, 47*b* with multiple spaced subsections.

The at least one pole piece may comprise a first pole piece connected to a first side of the at least one magnet and a second pole piece connected to an opposite second side of the at least one magnet, and where the first pole piece is a one-piece member with cuts therein which form at least some of the multiple spaced subsections in the first pole piece. The first pole piece may comprise at least two of the multiple spaced subsections connected by a relatively smaller bridge connection section. The first pole piece may comprise at least four of the multiple spaced subsections connected by a relatively smaller bridge connection section. The at least one pole piece may comprise a first pole piece connected to a first side of the at least one magnet and a second pole piece connected to an opposite second side of the at least one magnet, and where the second pole piece comprises a magnet assembly pot having a recess, where the at least one magnet is located in the recess, and where the second pole piece is a one piece member with cuts therein which form at least some of the multiple spaced subsections in the second pole piece. The magnet assembly pot may comprise at least two of the multiple spaced subsections connected by a relatively smaller bridge connection section. The magnet assembly pot may comprise least four of the multiple spaced subsections connected by a relatively smaller bridge connection section. The at least one pole piece may comprise a first pole piece connected to a first side of the at least one magnet and a second pole piece connected to an opposite second side of the at least one magnet, and where the second pole piece comprises multiple spaced members which are electrically isolated from each other and which form at least some of the multiple spaced subsections. The at least one pole piece may comprise a first pole piece connected to a first side of the at least one magnet and a second pole piece connected to an opposite second side of the at least one magnet, and where the second pole piece comprises multiple spaced members which are electrically isolated from each other and which form at least some of the multiple spaced subsections. The at least one magnet may comprise at least two magnets mechanically connected to each other by the at least one pole piece. The at least one magnet may comprise a first magnet having cuts therein to form a divided current loop area on the first magnet with multiple spaced magnet subsections. The at least one pole piece may comprise a first pole piece connected to a first side of the at least one magnet and a second pole piece connected to an opposite second side of the at least one magnet, and where the first and second pole pieces are connected to the at least one magnet by electrically insulating adhesive. The apparatus may comprise means for reducing eddy current heating of the at least one pole piece by magnetic fields. The apparatus may be provided in a device 10 comprising a housing; a rechargeable battery in the housing; and an induction charging system in the housing coupled to the rechargeable battery.

Figure 17:
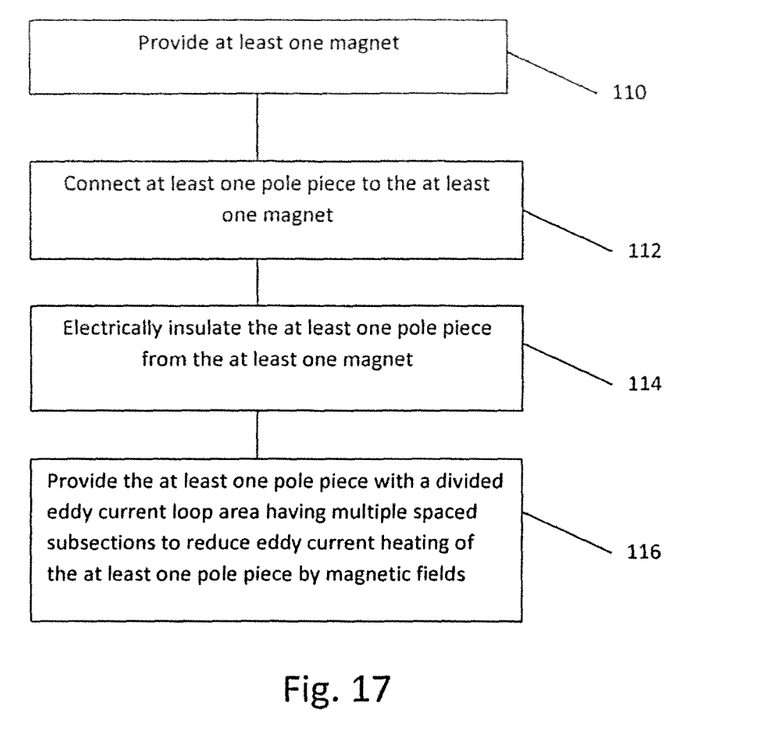
FIG. 17 is a diagram illustrating an example method.

Referring also to FIG. 17, an example method may comprises providing at least one magnet 110; and connecting 112 at least one pole piece to the at least one magnet, where the at least one piece is electrically insulated 114 from the at least one magnet, and where the at least one pole piece comprises a divided eddy current loop area 116 having multiple spaced subsections to reduce eddy current heating the at least one pole piece by magnetic fields.

The at least one pole piece may be provided with a first pole piece comprising:

a one-piece member with cuts therein which form at least some of the multiple spaced subsections in the first pole piece, or multiple spaced members which are electrically isolated from each other and which form at least some of the multiple spaced subsections, and/or the at least one pole piece may be provided with a second pole piece comprising a magnet assembly pot having a recess, where the at least one magnet is located in the recess, where the magnet assembly pot comprises:

a one piece member with cuts therein which form at least some of the multiple spaced subsections in the second pole piece, or multiple spaced members which are electrically isolated from each other and which form at least some of the multiple spaced subsections.

The method may comprise connecting a first pole piece of the at least one pole piece to a first side of the at least one magnet and connecting a second pole piece of the at least one pole piece to an opposite second side of the at least one magnet, and where first and second pole pieces are connected to the least one magnet by electrically insulating adhesive. The method may comprise the at least one magnet comprising at least two magnets, and the method comprises mechanically connecting the at least two magnets to each other by the at least one pole piece. The method may comprise forming cuts in a first one of the at least one magnet to form a divided current loop area on the first magnet with multiple spaced magnet subsections.

In another example, an apparatus 10 comprises a housing; a rechargeable battery in the housing; an induction charging system in the housing coupled to the rechargeable battery; and a magnet assembly in the housing, where the magnet assembly comprises at least one magnet and at least one pole piece connected to the at least one magnet, where the at least one pole piece is electrically insulated from the at least one magnet, and where a first one of the at least one pole piece comprises a divided eddy loop area having multiple spaced subsections to reduce eddy current heating of the first one pole piece by magnetic fields used for recharging the battery by the induction charging system.

The at least one pole piece may comprise the first pole piece connected to first side of the at least one magnet and a second pole piece connected to a second side of the magnet, where the second pole piece comprises a magnet assembly pot having a recess, where the at least one magnet is located in the recess, and where the second pole piece comprises a divided eddy current loop area having multiple spaced subsections to reduce eddy current heating of the second pole piece by the magnetic fields used for recharging the battery by the induction charging system.

In another example, an apparatus comprises magnet assembly comprising at least two magnet assembly components; and an eddy current heating reduction system configured to reduce heating of the magnet assembly by magnetic fields, where the eddy current heating reduction system comprises electrical insulation between the at least two magnet assembly components, and by providing at least one of the at least two magnet assembly components with a divided current loop area at least two spaced subsections. The at least two magnet assembly components may comprise, for example, a top plate, a pot, and at least one magnet. Electrical insulation may provided between at least two of the two magnet assembly components.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising an audio transducer having a magnet assembly, wherein the magnet assembly comprises:
   at least two magnet assembly components; and
   an eddy current heating reduction system configured to reduce heating of the magnet assembly by magnetic fields, where the eddy current heating reduction system comprises electrical insulation sandwiched between the at least two magnet assembly components, and by providing at least one of the at least two magnet assembly components with a divided current loop area having at least two planar spaced subsections formed by at least one cut or gap, where the at least two planar spaced subsections are aligned in a common plane forming a majority of the divided current loop area in the common plane.

2. An apparatus as in claim 1 where the at least two magnet assembly components comprise at least one magnet, a first pole piece connected to a first side of the at least one magnet and a second pole piece connected to an opposite second side of the at least one magnet, and where the first pole piece is a one-piece member, where the at least one cut or gap comprises multiple cuts in the one-piece member which form at least some of the at least two spaced subsections in the first pole piece.

3. An apparatus as in claim 2 where the first pole piece comprises at least one of:
   at least two of the spaced subsections connected by a relatively smaller bridge connection section, or
   at least four of the spaced subsections connected by a relatively smaller bridge connection section.

4. An apparatus as in claim 1 where the at least two magnet assembly components comprise at least one magnet, a first pole piece connected to a first side of the at least one magnet and a second pole piece connected to an opposite second side of the at least one magnet, and where the second pole piece comprises a magnet assembly pot having a recess, where the at least one magnet is located in the recess, and where the second pole piece is a one piece member, where the at least one cut or gap comprises multiple cuts in the one piece member of the second pile piece which form at least some of the spaced subsections in the second pole piece.

5. An apparatus as in claim 4 where the magnet assembly pot comprises at least two of the spaced subsections connected by a relatively smaller bridge connection section.

6. An apparatus as in claim 5 where the magnet assembly pot comprises at least four of the spaced subsections connected by a relatively smaller bridge connection section.

7. An apparatus as in claim 1 where the at least two assembly components comprise at least one magnet, a first pole piece connected to a first side of the at least one magnet and a second pole piece connected to an opposite second side of the at least one magnet, and where the first pole piece is a top plate which comprises multiple spaced members which are electrically isolated from each other and which form at least some of the spaced subsections.

8. An apparatus as in claim 1 where the at least two magnet assembly components comprise at least one magnet, a first pole piece connected to a first side of the at least one magnet and a second pole piece connected to an opposite second side of the at least one magnet, and where the second pole piece comprises multiple spaced members which are electrically isolated from each other and which form at least some of the at least two spaced subsections.

9. An apparatus as in claim 1 where the at least two magnet assembly components comprise at least two magnets and a first pole piece, where the at least two magnets are mechanically connected to each other by the first pole piece.

10. An apparatus as in claim 1 where the at least two magnet assembly components comprise a first magnet, where the at least one cut or gap comprises multiple cuts in the first magnet that form the divided current loop area on the first magnet with multiple spaced magnet subsections.

11. An apparatus as in claim 1 where the at least two magnet assembly components comprise at least one magnet, a first pole piece connected to a first side of the at least one magnet and a second pole piece connected to an opposite second side of the at least one magnet, and where the first and second pole pieces are connected to the at least one magnet by the electrical insulation which comprises electrically insulating adhesive.

12. An apparatus as in claim 1 comprising means for reducing eddy current heating of at least one of the magnet assembly components by magnetic fields.

13. A device comprising:
   a housing;
   a rechargeable battery in the housing;
   an induction charging system in the housing coupled to the rechargeable battery; and
   the apparatus as in claim 1 in the housing.

14. A method comprising:
   providing at least one magnet;
   connecting at least one pole piece to the at least one magnet, where the at least one pole piece is electrically insulated from the at least one magnet by electrical insulation sandwiched between the at least one pole piece and the at least one magnet, and where the at least one pole piece and/or the at least one magnet comprises a divided eddy current loop area having multiple planar spaced subsections formed by at least one cut or gap, where the multiple planar spaced subsections are aligned in a common plane forming a majority of the divided current loop area in the common plane to reduce eddy current heating of the at least one pole piece and/or the at least one magnet by magnetic fields; and
   constructing an audio transducer comprising a magnet assembly, the magnet assembly including the at least one magnet with the connected at least one pole piece.

15. A method as in claim 14 where the at least one pole piece:
   is provided with a first pole piece provided as a top plate comprising:
      a one-piece member, where the at least one cut or gap comprises multiple cuts in the one piece member which form at least some of the multiple spaced subsections in the first pole piece, or
      multiple spaced members which are electrically isolated from each other and which form at least some of the multiple spaced subsections, and/or
   is provided with a second pole piece comprising a magnet assembly pot having a recess, where the at least one magnet is located in the recess, where the magnet assembly pot comprises:
      a one piece member, where the at least one cut or gap comprises multiple cuts in the one piece member of the magnet assembly pot which form at least some of the multiple spaced subsections in the second pole piece, or multiple spaced members which are electrically isolated from each other and which form at least some of the multiple spaced subsections.

16. A method as in claim 14 comprising connecting a first pole piece of the at least one pole piece to a first side of the at least one magnet and connecting a second pole piece of the at least one pole piece to an opposite second side of the at least one magnet, and where the first and second pole pieces are connected to the at least one magnet by the electrical insulation which comprises electrically insulating adhesive.

17. A method as in claim 14 where the at least one magnet comprises at least two magnets, and the method comprises mechanically connecting the at least two magnets to each other by the at least one pole piece.

18. A method as in claim 14 wherein the at least one cut or gap comprises multiple cuts formed in a first one of the at least one magnet that form the divided current loop area on the first magnet with multiple spaced magnet subsections.

19. An apparatus comprising:
a housing;
a rechargeable battery in the housing;
an induction charging system in the housing coupled to the rechargeable battery; and
an audio transducer with a magnet assembly in the housing, where the magnet assembly comprises at least one magnet and a first pole piece connected to the at least one magnet, where the first pole piece is electrically insulated from the at least one magnet by electrical insulation sandwiched between the at least one magnet and the first pole piece, and where the first pole piece comprises a divided eddy current loop area having at least two planar spaced subsections formed by at least one cut or gap, where the at least two planar spaced subsections are aligned in a common plane forming a majority of the divided current loop area in the common plane to reduce eddy current heating of the first pole piece by magnetic fields used for recharging the battery by the induction charging system.

20. An apparatus as in claim 19 where the magnet assembly comprises the first pole piece connected to a first side of the at least one magnet and a second pole piece connected to a second side of the at least one magnet, where the first pole piece forms a top plate of the magnet assembly, where the second pole piece comprises a magnet assembly pot having a recess, where the at least one magnet is located in the recess, and where the second pole piece comprises a divided eddy current loop area having multiple spaced subsections to reduce eddy current heating of the second pole piece by the magnetic fields used for recharging the battery by the induction charging system.

* * * * *